US011455473B2

(12) United States Patent
Tagra et al.

(10) Patent No.: US 11,455,473 B2
(45) Date of Patent: Sep. 27, 2022

(54) VECTOR REPRESENTATION BASED ON CONTEXT

(71) Applicant: International Business Machines Corporation, Armonk, NY (US)

(72) Inventors: Ankur Tagra, Bangalore (IN); Krishnendu Saha, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 17/101,930

(22) Filed: Nov. 23, 2020

(65) Prior Publication Data

US 2021/0073473 A1 Mar. 11, 2021

Related U.S. Application Data

(63) Continuation of application No. 16/147,812, filed on Sep. 30, 2018, now Pat. No. 11,023,682.

(51) Int. Cl.
*G06F 16/34* (2019.01)
*G06F 40/30* (2020.01)
*G06F 40/279* (2020.01)
*G06N 20/00* (2019.01)
*G06F 16/33* (2019.01)

(52) U.S. Cl.
CPC ............ *G06F 40/30* (2020.01); *G06F 40/279* (2020.01); *G06F 16/3347* (2019.01); *G06F 16/345* (2019.01); *G06N 20/00* (2019.01)

(58) Field of Classification Search
CPC ..................... G06F 16/345; G06F 16/3347
See application file for complete search history.

(56) References Cited

U.S. PATENT DOCUMENTS

| 6,424,362 | B1 | 7/2002 | Bornstein et al. |
| 6,775,677 | B1 | 8/2004 | Ando et al. |
| 7,483,892 | B1 | 1/2009 | Sommer et al. |
| 7,831,597 | B2 | 11/2010 | Wu et al. |

(Continued)

FOREIGN PATENT DOCUMENTS

| CN | 107169086 | 9/2017 |
| EP | 3499384 | 6/2019 |

OTHER PUBLICATIONS

Chen, et al., IIS, "Leveraging Word Embeddings for Spoken Document Summarization," Academia Sinica, Taiwan 2015. (Year: 2015).*

(Continued)

*Primary Examiner* — Feng-Tzer Tzeng
(74) *Attorney, Agent, or Firm* — Lieberman & Brandsdorfer, LLC

(57) ABSTRACT

Embodiments relate to a system, program product, and method for use with an intelligent computer platform to create and apply textual data in vector format, and more specifically to apply context to the vector representation. Both context and document vectors are generated and assessed, with a calculated distance between the vectors corresponding to a weight. Word vectors are generated with associated word pairs and frequencies. A word vector generation model is trained. Utilization of the trained model generates one or more context sensitive word vector representations. A summarized sentence document is created and returned through application of the context sensitive word vectors.

20 Claims, 9 Drawing Sheets

(56) References Cited

U.S. PATENT DOCUMENTS

2010/0287162 A1    11/2010   Shirwadkar
2014/0195897 A1     7/2014   Balinsky et al.
2020/0081909 A1     3/2020   Li et al.

OTHER PUBLICATIONS

Chen, et al., "Leveraging Word Embeddings for Spoken Document Summarization," IIS, Academia Sinica, Taiwan 2015. (Year: 2015).*

Riedhammer et al., "Long story short—Global unsupervised models for keyphrase based meeting summarization," Speech Communication, vol. 52, 2010. (Year: 2010).*

Wan, et al., "Multi-Document Summarization Using Cluster-Based Link Analysis," ACM 2008. (Year: 2008).*

Rekabsaz, Navid et al., "Toward Incorporation of Relevant Documents in word2vec", SIGIR 2017 Workshop on Neural Information Retrieval, Apr. 4, 2018.

Zhu, Zhaocheng et al., "Context Aware Document Embedding", School of Electronics Engineering and Computer Science, Peking University, Jul. 5, 2017.

Palangi, Hamid et al., "Deep Sentence Embedding Using Long Short-Term Memory Networks: Analysis and Application to Information Retrieval", IEEE/ACM Transactions on Audio, Speech and Language Processing (TASLP) 24.4, 2016.

Mikolov, Tomas et al., "Efficient Estimation of Word Representations in Vector Space", arXiv 1301:3781, 2013.

Gelbukh, Alexander, International Journal of Computations Linguistics and Applications, vol. 5, No. 1, Jan.-Jun. 2014.

Chen, Kuan-Yu, "Leveraging Word Embeddings for Spoken Document Summarization", https://arxiv.org/abs/1506.04365, Jun. 14, 2015.

List of IBM Patents or Applications Treated as Related, Nov. 2020.

Ridehammer, Korbinian, et al., "Long story short—Global unsupervised models for keyphrase based meeting summarization", Speech Communication, vol. 52 (2010).

Wan, Xiaojun, et al., "Multi-Document Summarization Using Cluster-Based Link Analysis", ACM. pp. 299-306, (2008).

* cited by examiner

VECTOR REPRESENTATION BASED ON CONTEXT

CROSS REFERENCE TO RELATED APPLICATION(S)

This application is a Continuation patent application claiming the benefit of the filing date of U.S. patent application Ser. No. 16/147,812 filed on Sep. 30, 2018 and titled "Vector Representation Based on Content", now pending, the entire contents of which are hereby incorporated by reference.

BACKGROUND

The present embodiments relate to natural language processing. More specifically, the embodiments relate to generating word vectors and introducing contextual bias.

In the field of artificially intelligent computer systems, natural language systems (such as the IBM Watson® artificially intelligent computer system or and other natural language question answering systems) process natural language based on knowledge acquired by the system. To process natural language, the system may be trained with data derived from a database or corpus of knowledge, but the resulting outcome can be incorrect or inaccurate for a variety of reasons relating to the peculiarities of language constructs and human reasoning.

Word vectors refer to a set of language modeling and feature learning technique in natural language processing (NLP) where words or phrases from a vocabulary are mapped to vectors of real numbers. Words that share common context in a corpus are located or positioned in close proximity. It is understood in the art that algorithms embedded as models are used to produce word vectors. One known algorithm is referred to as word2vec, which is a neural net based model that converts words into equivalent vector representation, thereby giving equal weight to all documents present in a corpus. The word2vec is trained on an unsupervised corpus of data irrespective of any given context or domain.

SUMMARY

The embodiments include a system, computer program product, and method for application of a word vector representation to context.

In one aspect, a system is provided for use with an intelligent computer platform for vector representation of text and application of context to the representation(s). A processing unit is operatively coupled to memory and is in communication with an intelligence platform. Tools are provided in communication with the processing unit, including a document manager, a word manager, and a director. The document manager is responsible for both document and context assessment. More specifically, the document manager generates one or more context vectors and document vectors, and calculates a distance between the one or more generated document vectors and the one or more context vectors. The word manager is responsible for generating one or more document word vectors, which includes representing a document as a collection set of word pairs. In addition, the word manager trains a word vector generation model to generate one or more context sensitive word vector representation(s). The director is responsible for application of the trained word vector model to context. A summarized sentence document is returned from the director with auto-capture of one or more key words.

In another aspect, a computer program device is provided for use with an intelligent computer platform for vector representation of text and application of context to the representation(s). The processing unit has program code embodied therewith. Program code is provided for both document and context assessment. More specifically, the program code generates one or more context vectors and one or more document vectors, and calculates a distance between the one or more generated document vectors and the one or more context vectors. In addition, program code is provided to generate one or more document word vectors, which includes representing the one or more documents as a collection set of word pairs and their frequencies. In addition, the program code trains a vector generation model to generate one or more context sensitive word vector representation(s). Program code applies the trained word vector model to context. A summarized sentence document is returned with auto-capture of one or more key words.

In yet another aspect, a method is provided for use by an intelligent computer platform for vector representation of text and application of context to the representation(s). One or more context vectors and one or more document vectors are generated, and a distance between the one or more generated document vectors and the one or more context vectors is calculated. In addition, one or more document word vectors is generated, which includes representing the one or more documents as a collection set of word pairs and their frequencies. A vector generation model is trained to generate one or more context sensitive word vector representation(s). Thereafter, the trained word vector model is applied to context, and a summarized sentence document is returned with auto-capture of one or more key words.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Figure 1:
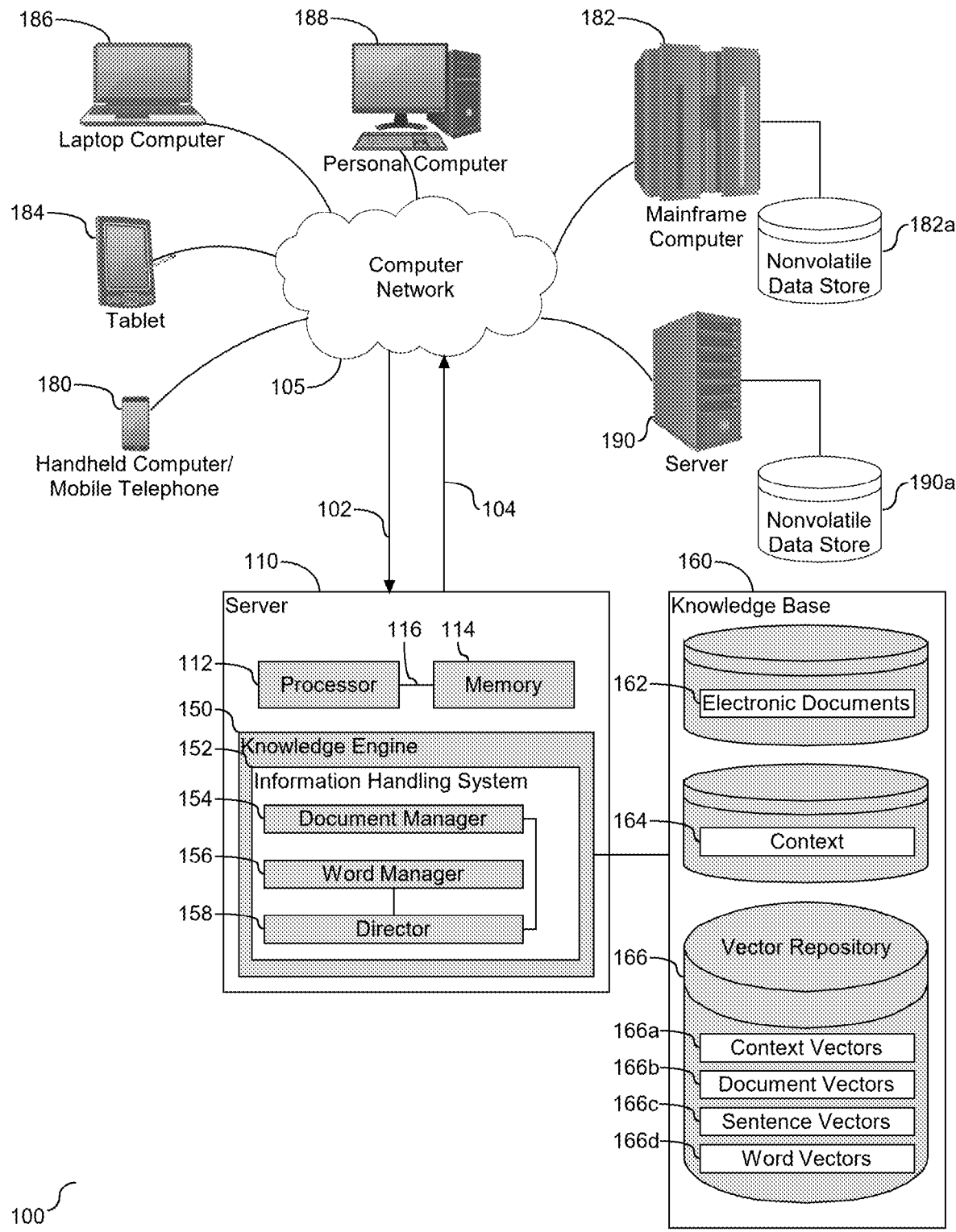
FIG. 1 depicts a system diagram illustrating a schematic diagram of a computer system configured to provide context to word vector and document vector representations.

Referring to FIG. 1, a schematic diagram of a computer system (100) is depicted to provide context to word vector and document vector representations. As shown, a server (110) is provided in communication with a plurality of computing devices (180), (182), (184), (186), and (188) across a network connection (105). The server (110) is configured with a processing unit (112) in communication with memory (114) across a bus (116). The server (110) is shown with a knowledge engine (150) for document and context processing over the network (105) from one or more computing devices (180), (182), (184), (186) and (188). More specifically, the computing devices (180), (182), (184), (186), and (188) communicate with each other and with other devices or components via one or more wired and/or wireless data communication links, where each communication link may comprise one or more of wires, routers, switches, transmitters, receivers, or the like. In this networked arrangement, the server (110) and the network connection (105) enable processing of documents and context for one or more content users. Other embodiments of the server (110) may be used with components, systems, subsystems, and/or devices other than those that are depicted herein.

The knowledge engine (150) may be configured to receive input from various sources. For example, knowledge engine (150) may receive input from the network (105), one or more knowledge bases of corpus (160) of electronic documents (162), or other data, content users, and other possible sources of input. In selected embodiments, the knowledge base (160), also referred to herein as corpus, may include structured, semi-structured, and/or unstructured content in a plurality of documents that are contained in one or more large knowledge databases or corpus. The various computing devices (180), (182), (184), (186), and (188) in communication with the network (105) may include access points for content creators and content users. Some of the computing devices may include devices for a database storing the corpus of data as the body of information used by the knowledge engine (150), and to process the corpus of data with respect to word vector generation based on context, thereby enhancing natural language based services. The network (105) may include local network connections and remote connections in various embodiments, such that the knowledge engine (150) may operate in environments of any size, including local and global, e.g. the Internet. Additionally, the knowledge engine (150) serves as a front-end system that can make available a variety of knowledge extracted from or represented in documents, network accessible sources and/or structured data sources. In this manner, some processes populate the knowledge engine (150) with the knowledge engine (150) also including input interfaces to receive requests and respond accordingly.

As shown, content may be in the form of one or more electronic documents or files (162) for use as part of the corpus (160) of data with the knowledge engine (150). The corpus (160) may include any structured and unstructured documents, including but not limited to any file, text, article, or source of data (e.g. scholarly articles, dictionary, definitions, encyclopedia references, and the like) for use by the knowledge engine (150). Content users may access the knowledge engine (150) via a network connection or an internet connection to the network (105), and may submit natural language input to the knowledge engine (150) that may effectively be processed into context based word vector representation. As further described below, the word vector representation functions as a model to summarize a document with auto capture of one or more key words.

Context (164), e.g. given by a problem definition or extracted from behavior, is communicated to the knowledge engine (150), so that the context (164) may be interpreted and utilized by the knowledge engine (150). As shown, the knowledge engine (150) is local to the server (110). In some illustrative embodiments, server (110) may be the IBM Watson® system available from International Business Machines Corporation of Armonk, N.Y., which is augmented with the mechanisms of the illustrative embodiments described hereafter. As shown, the server (110) includes an information handling system (152) which utilizes tools in the form of a document manager (154), a word manager (156), and a director (158). Though shown as being embodied in or integrated with the server (110), the information handling system (152) and the associated managers (154) and (156), and director (158) may be implemented in a separate computing system (e.g., 190) that is connected across network (105) to the server (110). Wherever embodied, the managers (154) and (156), and the director (158), function to provide and assess contextual analysis of documents with respect to associated context.

The document manager (154) functions to assign a context based document weight to each document in a corpus, and to compute document relevance. More specifically, the document manager generates context vectors (166a) for the assigned context and document vectors (166b) for each document in the corpus. In one embodiment, the generated vectors are stored in the vector repository (166). With these vectors, the document manager (154) calculates a distance there between, e.g. between the generated document vectors and the context vectors, and assigns a weight to each document based on the calculated distance. In addition, the document manager (154) calculates a relevance score between the context vector(s) and the document vector(s). In one embodiment, the document manager (154) creates a sentence vector representation (166*c*) of a document sentence, forms one or more sentence clusters, and extracts a cluster representative sentence for each formed cluster. See FIG. 5 for details of the sentence clustering and application thereof. The document manager (154) may organize one or more of the cluster representative sentences in a document as a context sensitive document summary. Accordingly, the document manager (154) generates separate context and document vectors, and combines the vector representations to embed content sensitivity into document evaluation.

The word manager (156), shown herein as operatively coupled to the document manager (154), functions to generate word vectors (166*d*) for the documents in the corpus using a word vector generation model. More specifically, the word manager (156) represents each document in the corpus as a collection set of word pairs and the frequencies of the word pairs in the each associated document. The word manager (156) trains a word vector generation model with the word pairs and a calculated weighted frequency so as to generate context sensitive word vector representation(s). Accordingly, the word manager (156) employs context sensitivity into the generated word vector representations of word pairs in each document to outputs output context sensitive word vectors.

As shown, the director (158) is operatively coupled to both the document manager (154) and the word manager (156). The director (158) functions to apply the word vector model generated by the word manager (154) to context utilized by the document manager (156). This application enables the director (158) to return a summarized sentence document with auto-capture of one or more keywords in the document. See FIG. 6 for details of the auto-capture. More specifically, as further shown and described in FIG. 6, the director (158) calculates a Euclidian distance between a context sensitive word vector representation and content neutral word vector representations, with the word vector representations provided by the word manager (156). The director (158) further identifies context sensitive keyword(s) based on the Euclidian distance, and then applies these identified keywords to a document. Accordingly, the director (158) leverages the functionality of both the document manager (154) and the word manager (156) to employ context sensitivity into keyword identification and utilization.

As shown, the information handling system (152) employs three tools, e.g. sub-engines to support contextual vector representation, including the document manager (154), the word manager (156), and the director (158). The functionality of each tool is shown and described herein. A result of processing context with respect to document and word vectors presentations as provided by the information handling system (152), contextual sensitivity is brought into sentence and keyword identification and utilization. Types of information handling systems that can utilize system (110) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen or tablet computers (184), laptop or notebook, computers (186), personal computer system (188), and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store (190*a*), and mainframe computer (182) utilizes nonvolatile data store (182*a*)). The nonvolatile data store (182*a*) can be a component that is external to the various information handling systems or can be internal to one of the information handling systems.

Figure 2:
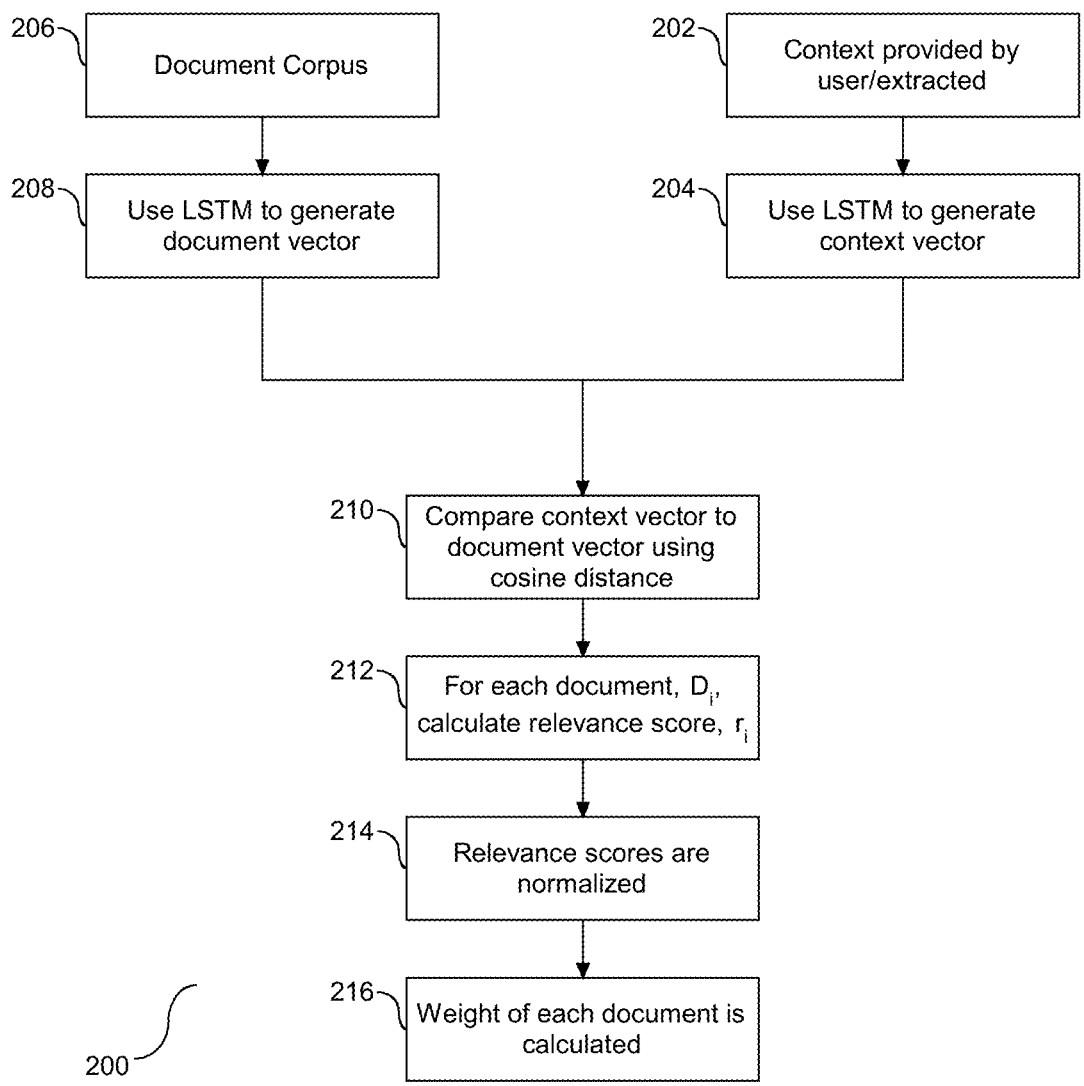
FIG. 2 depicts a flow chart illustrating calculation of document relevance and an associated document relevance score.

Referring to FIG. 2, a flow chart (200) is provided illustrating calculation of document relevance and an associated document relevance score. There are two input elements, including context and a document corpus. Context is either provided by or extracted from a user (202), and presented to an algorithm to generate context vectors (204). In one embodiment, a recurrent neural net based model known as Long Short-Term Memory (LSTM) is utilized for the context vector generation. In parallel with or separate from steps (202) and (204), a document corpus is provided or otherwise identified (206) and a vector generation algorithm is utilized to generate document vectors for each document in the corpus (208). In one embodiment, the LSTM model is used at step (208) for the document vector generation. The vectors created at steps (204) and (208) are utilized as input and a comparison is conducted of the context vector(s) to the document vector(s) (210). For each document, $D_i$, a relevance score, $r_i$, is calculated (212). More specifically, the relevance score calculated at step (212) is a cosine distance between the context vector(s) and the document vector(s). The calculated relevance scores, $r_i$, are normalized (214). In one embodiment, the relevance scores are normalized and scaled to avoid fractional truncation. Similarly, in one embodiment, a softmax function is utilized at step (214) for the relevance score normalization, although this function utilization should not be considered limiting. Following step (214), a weight for each document is calculated (216). The weight is calculated using the following formula:

$$w_i = kX \frac{e^{r_i}}{\sum_i e^{r_i}}$$

where $r_i$ is the cosine of the angle between context and the document and the ith document, and k is a scaling factor. Accordingly, as shown and described herein a numerical assessment of documents is calculated with respect to context.

Figure 3:
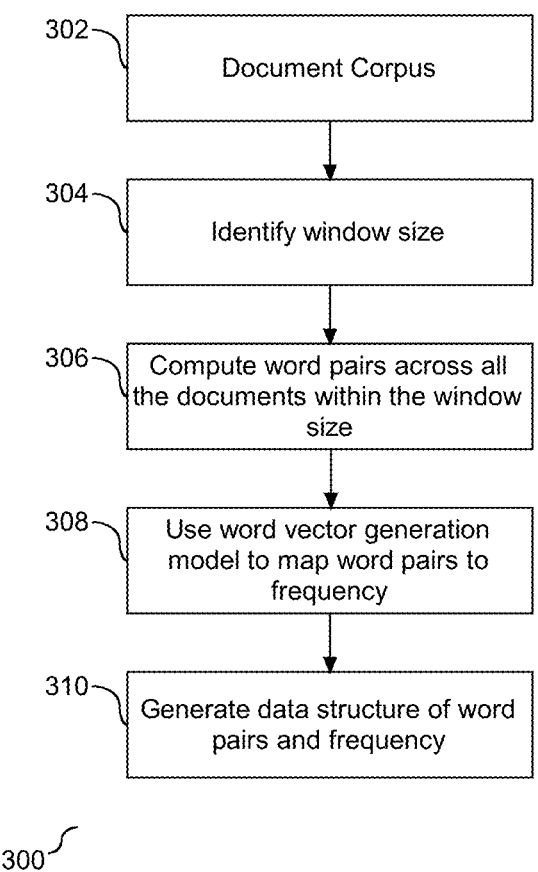
FIG. 3 depicts a flow chart illustrating a process for assessing words within the documents that comprise the corpus.

In addition to context and document assessment, words within the documents that comprise the corpus are also evaluated. Referring to FIG. 3, a flow chart (300) is provided illustrating a process for assessing words within the documents that comprise the corpus. More specifically, as shown and described, the word assessment is independent of context. The document corpus utilized in FIG. 2 is provided or otherwise identified (302). A window size is identified (304), and word pairs are computed across all the documents within the window size (306). Using a word vector generation model, the words pairs are mapped to frequency (308). In one embodiment, the window size parameter is referred to as a distance size. Similarly, in one embodiment, the word vector generation model is referred to as skipgram, which is a word vector generation model that is used to predict surrounding words of a given word in a sentence in a document. Given a sequence of words, $wd_1$, $wd_2$, $wd_3$, ... $wd_T$, the objective is to maximize the log probability:

$$\frac{1}{T}\sum_{c=1}^{T}\sum_{-t \leq j \leq t, j \neq 0} \log p(wd_{c+j} | wd_c)$$

where t is the window size provided as a parameter at the time of training. Output in the form of a data structure of word pairs and associated frequency is generated (310). Accordingly, each document in the corpus is represented as a collection set of unique word pairs and their associated frequencies, wherein wp represents the set of unique word pairs, and each member in the set is identified as wd, such that wp={$wd_i$, $wd_o$} and their frequencies, $f_{wp}$.

Figure 4:
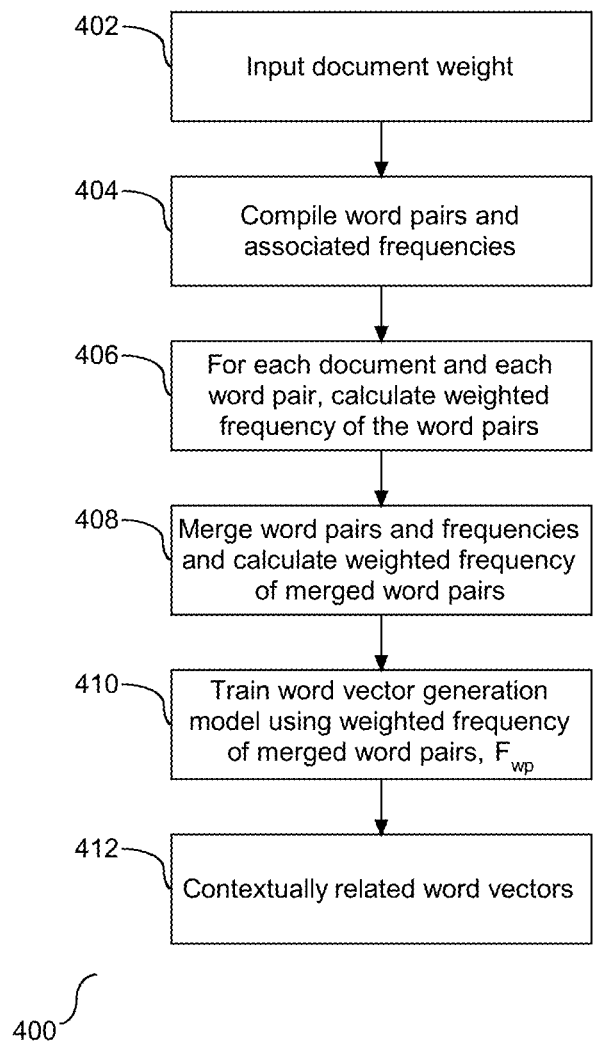
FIG. 4 depicts a flow chart illustrating a process for identifying and generating contextually related word vectors based on the assessment of the documents with respect to content provided in FIG. 2 and the data structure of word pairs generated in FIG. 3.

Referring to FIG. 4, a flow chart (400) is provided illustrating a process for identifying and generating contextually related word vectors based on the assessment of the documents with respect to content provided in FIG. 2 and the data structure of word pairs generated in FIG. 3. Input is provided in the form of the document weight (402) assessed in FIG. 2, and the word pairs and associated frequencies (404) compiled in FIG. 3. For each document in the corpus and each word pair, a weighted frequency of the word pairs is calculated (406). In one embodiment, the weighted frequency of word pairs is a cross product of the frequency and the associated weight, e.g. $f_{wp}^{(i)} \times w_i$. Thereafter, the word pairs and their frequencies are merged across the corpus and a weighted frequency of the merged word pairs is calculated (408). In one embodiment, the calculation at step (408) is based on the following formula:

$$F_{wp} = \Sigma_i f_{wp}^{(i)} \times w_i$$

The word vector generation model, e.g. skipgram, is trained using the weighted frequency of merged word pairs. More specifically, the weighted frequency of merged word pairs, $F_{wp}$, is used as input to the word vector generation model for the model training (410). More specifically, the model training is based on the context vector with application of the weighted frequencies on the word pairs. The trained model creates contextually related word vectors (412). Accordingly, the output at step (412) is a model of context sensitive word vectors.

Figure 5:
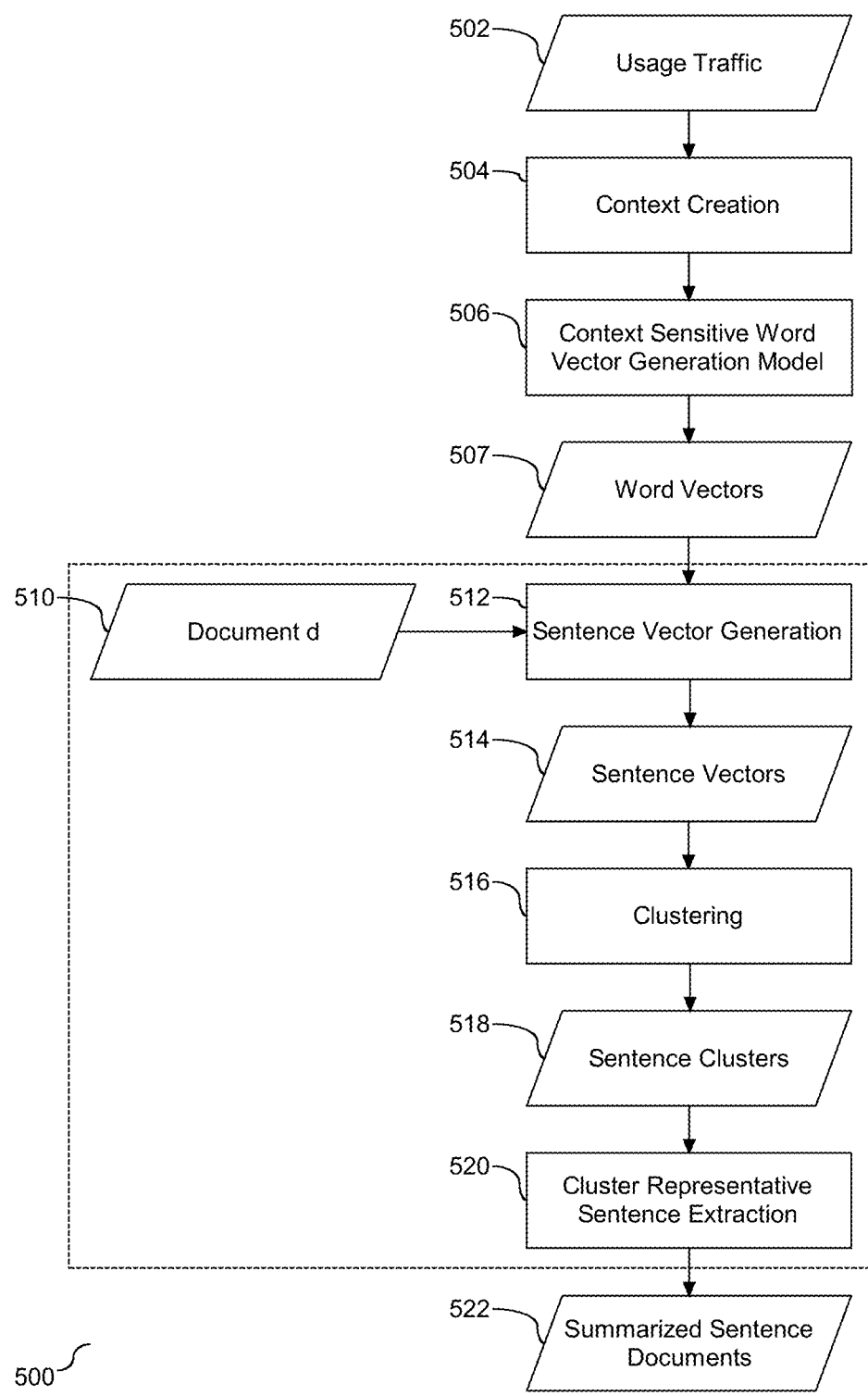
FIG. 5 depicts a flow chart illustrating a process of application of the proposed model with respect to a NLP provider.

The processes shown and described in FIGS. 2-4 are designed to be applied into a real-world application. In one embodiment, the application may be directed to a natural language processing (NLP) environment. For example, a new company may be a client of a NLP based services provider. The processes shown and described in FIGS. 2-4 may be applied to the content of the NLP service provider to create and deliver customized NLP services directed at the client. Referring to FIG. 5, a flow chart (500) is provided illustrating a process of application of the proposed model with respect to a NLP provider. As show, web site usage traffic is tracked and/or gathered (502). In one embodiment, the data at step (502) may correlate with a quantity of visits to one or more web site addresses. Context is automatically created based on behavior (504), such as a set of documents visited. Document visits are tracked, and documents that have been accessed or visited more than a threshold, t, are considered for context document creation and those documents are appended into a single document. The context generation at step (504) is similar to the context provided or extracted in FIG. 2, e.g. step (202). The context is applied to the processes shown in FIGS. 2-4. More specifically, the context at step (504) is applied to a context sensitive word vector generation model (506) to generate contextually related word vectors (507). Accordingly, the compiled context is applied to the processes shown in FIGS. 2-4 to generate contextually related word vectors directed at specific context.

The client can provide their context to the word vectors to receive customized NLP services. For example, a document may be applied to the output of the vectors at step (507) to identify key elements within the document. As shown, a document is provided and separated into sentences (510). A sentence vector is generated for each sentence in the document (512), to create sentence vectors (514). Related sentence vectors are identified and grouped together, e.g. clustering (516) to create sentence clusters (518). In one embodiment, the sentence vectors are clustered using a mean-shift clustering algorithm. For each sentence cluster, a cluster representative sentence is extracted (520). In one embodiment, the representative sentence may be the centroid for each cluster or a sentence in the mean of the cluster. Similarly, in one embodiment, the cluster representative sentence is a sentence with a vector closest to a mean vector of the cluster. The cluster representative sentence for each cluster is provided as a context sensitive sentence identified within the supplied document (522). In one embodiment, two or more sentences are provided at step (522) with each sentence related to a separate sentence cluster within the supplied document. The sentence output at step (522) effectively highlights aspects of the document. Accordingly, the sentence(s) output is directed at a summarization of the supplied documents.

Figure 6:
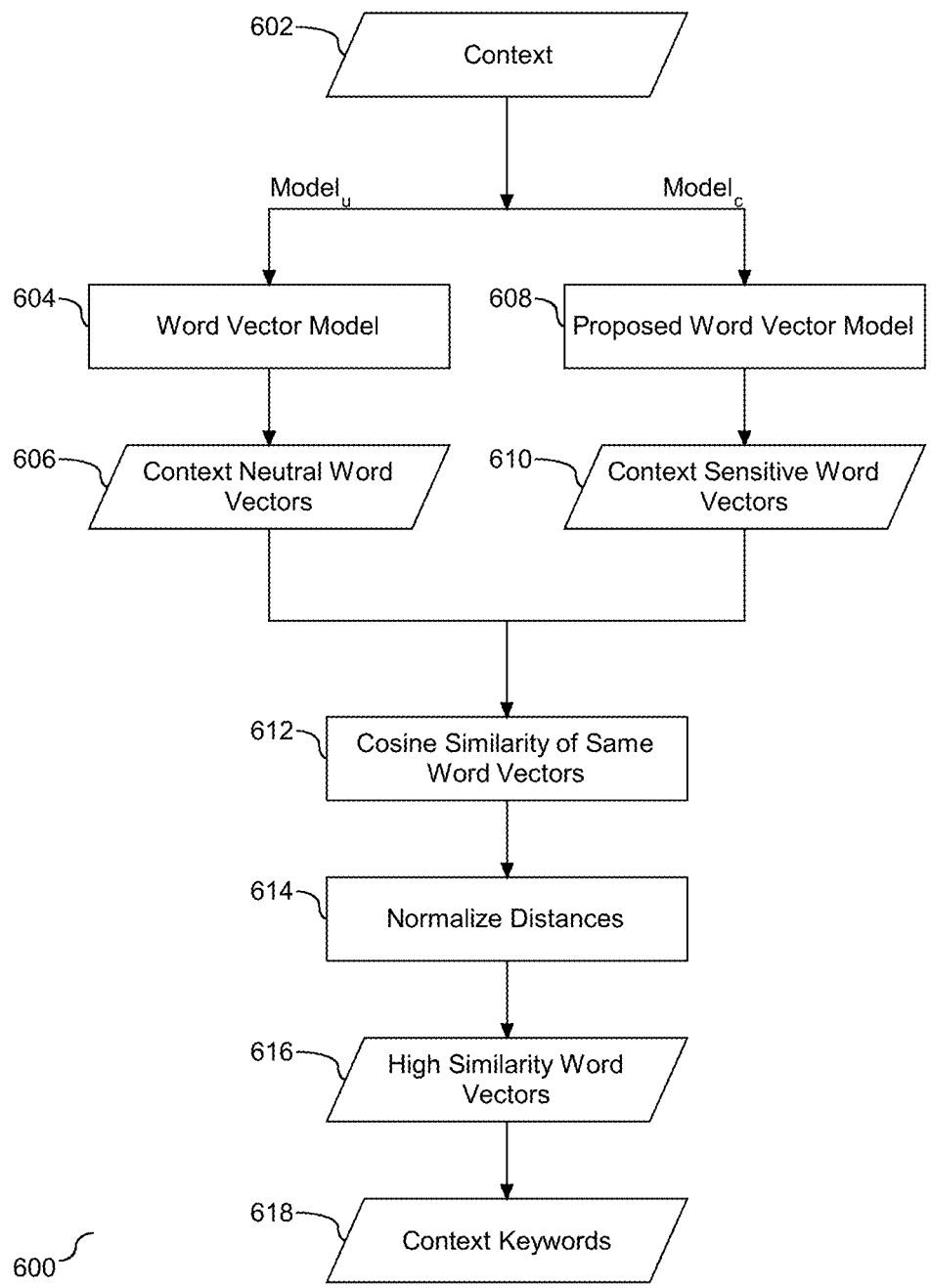
FIG. 6 depicts a flow chart illustrating a process for identifying one or more keywords for a given context.

As shown and described, a model of contextually sensitive word vectors is created and enables application of a document to the model to identify or highlight context sensitive sentences within the document. In addition, the modeling may be applied to identify context sensitive keywords. Referring to FIG. 6, a flow chart (600) is provided illustrating a process for identifying one or more keywords for a given context. As shown, context is provided as input (602). The context may be manually provided, or may be identified and provided based on behavior. Two models are trained to identify keywords for the context, C. One model, $model_c$ uses context C and the other model, $model_U$, uses universal content. In one embodiment, the model training is conducted in parallel. A word vector model is utilized for each of the paths shows. More specifically, a standard word vector model without any associated frequency identification is utilized (604) to generate content neutral word vectors (606). Similarly, a proposed word vector model is utilized (608) to generate context sensitive word vectors (610). Accordingly, two different representations are generated at steps (606) and (608) depending on the associated word vector model applied to the content.

A cosine distance is calculated for each word between the respective word vector representations (612). The distances are normalized (614), and words above a distance threshold value are selected (616). More specifically, the words associated with the values selected at step (616) are identified as keywords for the applied content (618). The identified keywords are referred to as context sensitive keywords. In one embodiment, the identified keywords may be implicitly present in the context and not expressly present. Similarly, in one embodiment, the context sensitive keywords may be applied to identify related documents, such as relative electronic messages, or to auto-capture the keywords, e.g. highlight the keywords, in a document. In one embodiment, the process shown and described herein may train two independent context word vector models for two languages to seed a list of pairs used to train a mapping function to align language spaces. Accordingly, the values identified as context sensitive keywords for the applied context is related to a shift in the vector representation caused by context specific training of the word vectors.

The context sensitivity shown and described herein may be applied to various real world applications. For example, with respect to NLP and the NLP model shown and described in FIG. 5, after the NLP model is training for a context, further classification of documents within that field will be effective because field related words will receive a prominent alignment in the vector space. Similarly, the processes shown herein may be applied to sentiment analysis for a heterogeneous corpus, e.g. a corpus containing multiple contexts, such as blog and documents. Accordingly, the processes shown and described herein is directed at improving word vector modeling for a given context, application of the modeling to a NLP environment to accommodate context abilities, e.g. topic identification and document summarization, and identification of context sensitive keywords and application of these keywords.

Embodiments may also be in the form of a computer program device for use with an intelligent computer platform in order to assist the intelligent computer platform to leverage context into document and word vector representations. The device has program code embodied therewith. The program code is executable by a processing unit to execute the functionality of the tools of the knowledge engine (152), e.g. the document manager (154), the word manager (156), and the director (158). Aspects of the functional tools, e.g. document manager, word manager, and director, and their associated functionality may be embodied in a computer system/server in a single location, or in one embodiment, may be configured in a cloud based system sharing computing resources. With references to FIG. 7, a block diagram (700) is provided illustrating an example of a computer system/server (702), hereinafter referred to as a host (702) in communication with a cloud based support system, to implement the processes described above with respect to FIGS. 1-6. Host (702) is operational with numerous other general purpose or special purpose computing system environments or configurations. Examples of well-known computing systems, environments, and/or configurations that may be suitable for use with host (702) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (702) may be described in the general context of computer system-executable instructions, such as program modules, being executed by a computer system. Generally, program modules may include routines, programs, objects, components, logic, data structures, and so on that perform particular tasks or implement particular abstract data types. Host (702) may be practiced in distributed cloud computing environments where tasks are performed by remote processing devices that are linked through a communications network. In a distributed cloud computing environment, program modules may be located in both local and remote computer system storage media including memory storage devices.

Figure 7:
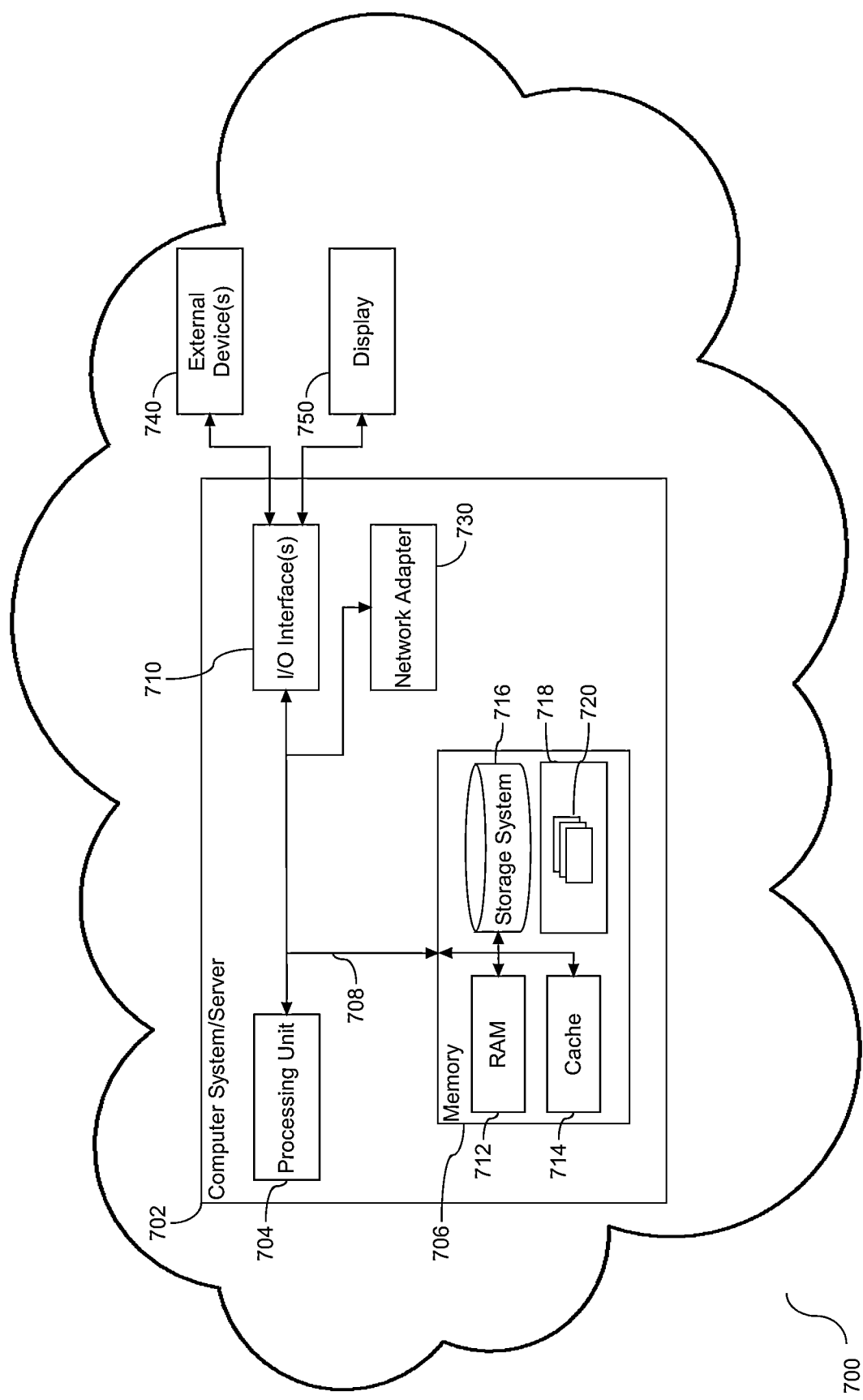
FIG. 7 depicts a block diagram illustrating an example of a computer system/server of a cloud based support system, to implement the system and process described above with respect to FIGS. 1-6.

As shown in FIG. 7, host (702) is shown in the form of a general-purpose computing device. The components of host (702) may include, but are not limited to, one or more processors or processing units (704), e.g. hardware processors, a system memory (706), and a bus (708) that couples various system components including system memory (706) to processor (704). Bus (708) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (702) typically includes a variety of computer system readable media. Such media may be any available media that is accessible by host (702) and it includes both volatile and non-volatile media, removable and non-removable media.

Memory (706) can include computer system readable media in the form of volatile memory, such as random access memory (RAM) (712) and/or cache memory (714). By way of example only, storage system (716) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (708) by one or more data media interfaces.

Program/utility (718), having a set (at least one) of program modules (720), may be stored in memory (706) by way of example, and not limitation, as well as an operating system, one or more application programs, other program modules, and program data. Each of the operating systems, one or more application programs, other program modules, and program data or some combination thereof, may include an implementation of a networking environment. Program modules (720) generally carry out the functions and/or methodologies of embodiments supported by the information handling system (152) and the tools (154)-(158). For example, the set of program modules (720) may include the modules configured as the document and word managers, and the director as described in FIGS. 1-6.

Host (702) may also communicate with one or more external devices (740), such as a keyboard, a pointing device, etc.; a display (750); one or more devices that enable a user to interact with host (702); and/or any devices (e.g., network card, modem, etc.) that enable host (702) to communicate with one or more other computing devices. Such communication can occur via Input/Output (I/O) interface(s) (710). Still yet, host (702) can communicate with one or more networks such as a local area network (LAN), a general wide area network (WAN), and/or a public network (e.g., the Internet) via network adapter (730). As depicted, network adapter (730) communicates with the other components of host (702) via bus (708). In one embodiment, a plurality of nodes of a distributed file system (not shown) is in communication with the host (702) via the I/O interface (710) or via the network adapter (730). It should be understood that although not shown, other hardware and/or software components could be used in conjunction with host (702). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (706), including RAM (712), cache (714), and storage system (716), such as a removable storage drive and a hard disk installed in a hard disk drive.

Computer programs (also called computer control logic) are stored in memory (706). Computer programs may also be received via a communication interface, such as network adapter (730). Such computer programs, when run, enable the computer system to perform the features of the present embodiments as discussed herein. In particular, the computer programs, when run, enable the processing unit (704) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (702) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
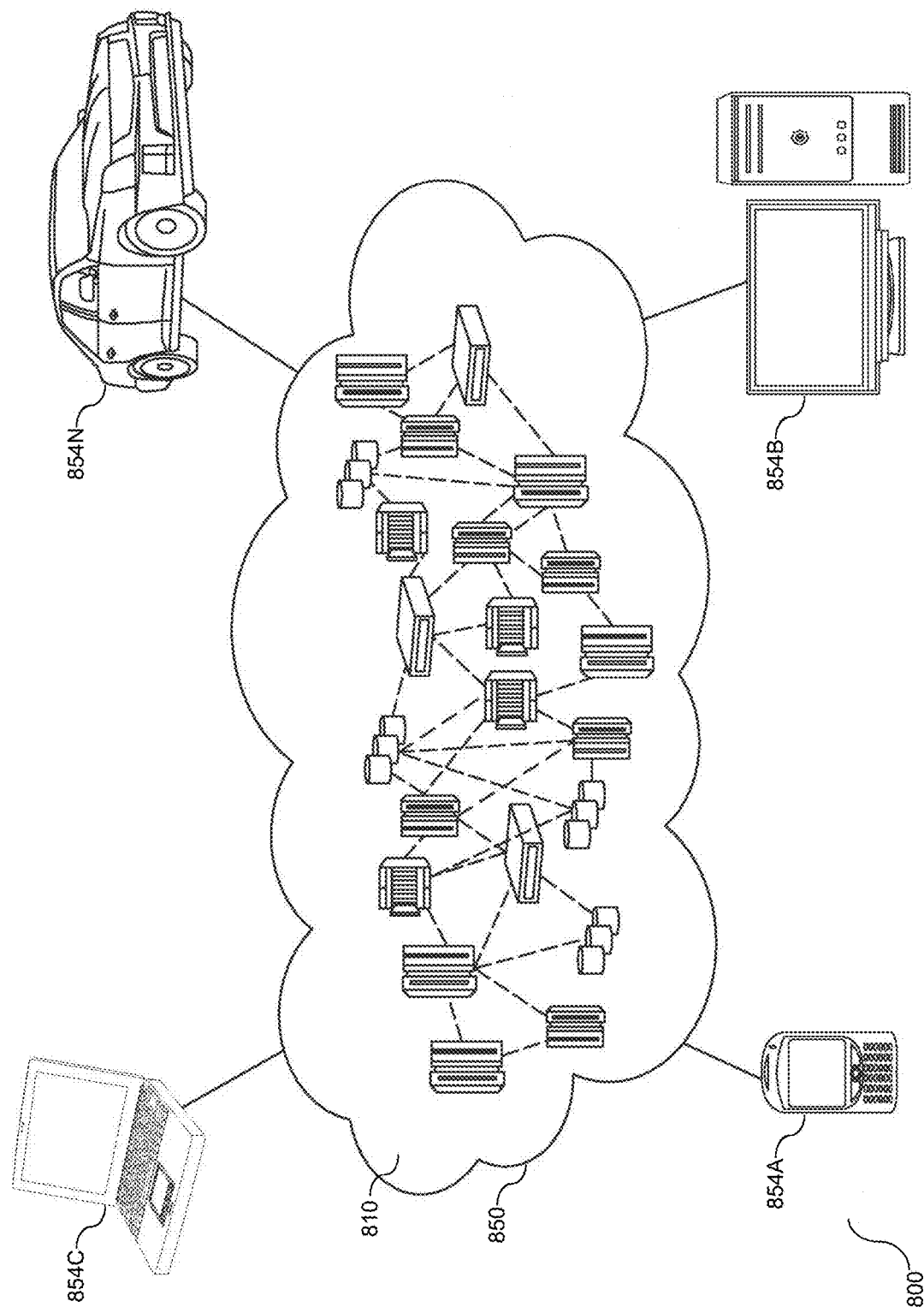
FIG. 8 depicts a block diagram illustrating a cloud computer environment.

Referring now to FIG. 8, an illustrative cloud computing network (800). As shown, cloud computing network (800) includes a cloud computing environment (850) having one or more cloud computing nodes (810) with which local computing devices used by cloud consumers may communicate. Examples of these local computing devices include, but are not limited to, personal digital assistant (PDA) or cellular telephone (854A), desktop computer (854B), laptop computer (854C), and/or automobile computer system (854N). Individual nodes within nodes (810) may further communicate with one another. They may be grouped (not shown) physically or virtually, in one or more networks, such as Private, Community, Public, or Hybrid clouds as described hereinabove, or a combination thereof. This allows cloud computing environment (800) to offer infrastructure, platforms and/or software as services for which a cloud consumer does not need to maintain resources on a local computing device. It is understood that the types of computing devices (854A-N) shown in FIG. 8 are intended to be illustrative only and that the cloud computing environment (850) can communicate with any type of computerized device over any type of network and/or network addressable connection (e.g., using a web browser).

Figure 9:
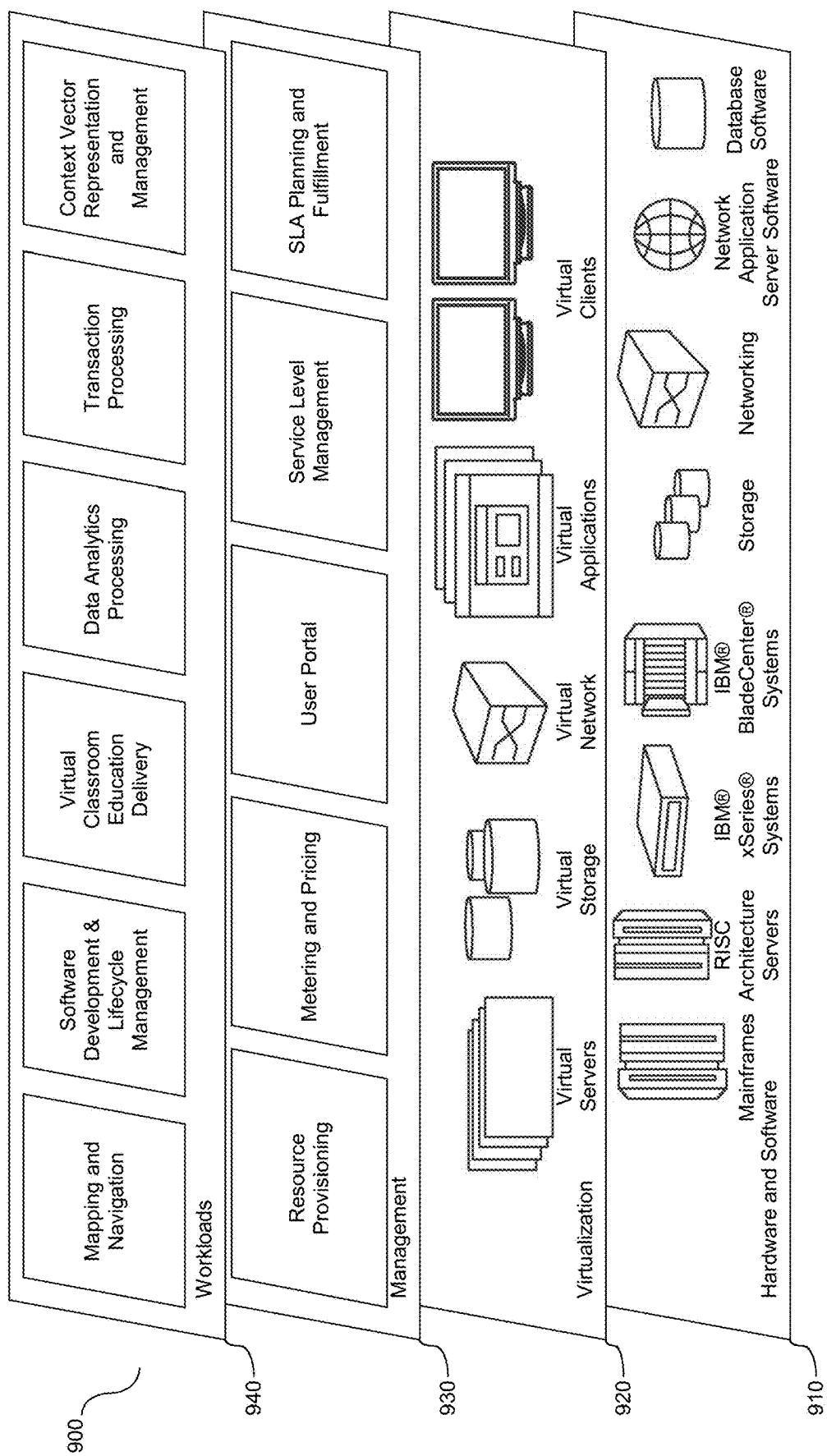
FIG. 9 depicts a block diagram illustrating a set of functional abstraction model layers provided by the cloud computing environment.

Referring now to FIG. 9, a set of functional abstraction layers (900) provided by the cloud computing network of FIG. 8 is shown. It should be understood in advance that the components, layers, and functions shown in FIG. 9 are intended to be illustrative only, and the embodiments are not limited thereto. As depicted, the following layers and corresponding functions are provided: hardware and software layer (910), virtualization layer (920), management layer (930), and workload layer (940). The hardware and software layer (910) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (920) provides an abstraction layer from which the following examples of virtual entities may be provided: virtual servers; virtual storage; virtual networks, including virtual private networks; virtual applications and operating systems; and virtual clients.

In one example, management layer (930) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (940) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and context vector representations and management.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The embodiments are described herein with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

It will be appreciated that, although specific embodiments have been described herein for purposes of illustration, various modifications may be made without departing from the spirit and scope of the specific embodiments described herein. Accordingly, the scope of protection is limited only by the following claims and their equivalents.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single dataset, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of the disclosed embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

The corresponding structures, materials, acts, and equivalents of all means or step plus function elements in the claims below are intended to include any structure, material, or act for performing the function in combination with other claimed elements as specifically claimed. The description of the present embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated. Accordingly, the leverage of context into the word and document vector representations and associated vector modeling provides context sensitivity with respect to sentence and/or key word identification.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiment may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiment may take the form of computer program product embodied in a computer readable storage medium (or media) having computer readable program instructions thereon for causing a processor to carry out aspects of the present embodiment. Thus embodied, the disclosed system, a method, and/or a computer program product is operative to improve the functionality and operation of a machine learning model based on pattern dissection of analogies and their meanings to determine outcomes, including an extended characteristic of key items in the analogical patterns.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiment may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiment.

Aspects of the present embodiment are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. In particular, the context identification shown and described herein may be identified dynamically over a period of time and used for generation of word vectors, so that the model is dynamically and automatically retrained on next context. Accordingly, the scope of protection of the embodiments is limited only by the following claims and their equivalents.

What is claimed is:

1. A computer system comprising:
  a processing unit operatively coupled to memory; and
  a tool in communication with the processing unit to create a word vector representation and to apply the word vector representation to context, including:
    a document manager configured to compute document relevance, including generate one or more document vectors for one or more documents, calculate respective distances between the one or more generated document vectors and one or more context vectors generated for context provided by a user or extracted from user behavior, and assign respective weights to the one or more documents based on the calculated distances;
    a word manager operatively coupled to the document manager, the word manager configured to:
      generate one or more word vectors for the one or more documents, including represent the one or more documents as a collection set of word pairs from the one or more documents and respective frequencies associated with the word pairs in the one or more documents; and train a word vector generation model with at least a calculated weighted frequency, including train the word vector generation model to generate one or more context sensitive word vector representations, the calculated weighted frequency based upon the respective weights assigned to the one or more documents and the frequencies associated with the word pairs; and a director operatively coupled to the document manager and the word manager, the director configured to apply the trained word vector model to context, including using the word vector generation model to generate the one or more context sensitive word vector representations.

2. The computer system of claim 1, wherein the word manager is configured to calculate the weighted frequency on one or more word pairs and introduce context sensitivity into the word vectors.

3. The computer system of claim 1, wherein the director being configured to auto capture one or more keywords further comprises the director configured to calculate a Euclidian distance between a context sensitive word vector representation and a content neutral word vector representation, and identify the one or more context sensitive keywords based on the Euclidian distance.

4. The computer system of claim 1, wherein the application of the trained word vector model to context further comprises the document manager configured to apply a document to the context sensitive word vector representation and create a sentence vector representation of a document sentence, form one or more sentence clusters, and extract a cluster representative sentence for a formed cluster.

5. A computer program product to create and apply word vector representation to context, the computer program product comprising:
a computer readable storage medium having program code embodied therewith, the program code executable by a processing unit to:
generate one or more context vectors for context provided by a user or extracted from user behavior;
compute document relevance, including generate one or more document vectors for one or more documents, calculate respective distances between the one or more generated document vectors and the one or more context vectors, and assign respective weights to the one or more documents based on the calculated distances;
generate one or more word vectors for the one or more documents, including represent the one or more documents as a collection set of word pairs from the one or more documents and respective frequencies associated with the word pairs in the one or more documents;
train a word vector generation model with at least a calculated weighted frequency, including train the word vector generation model to generate one or more context sensitive word vector representations, the calculated weighted frequency based upon the respective weights assigned to the one or more documents and the frequencies associated with the word pairs; and
apply the trained word vector model to context, including using the word vector generation model to generate the one or more context sensitive word vector representations.

6. The computer program product of claim 5, further comprising program code executable by the processing unit to calculate the weighted frequency on one or more word pairs and introduce context sensitivity into the word vectors.

7. The computer program product of claim 5, wherein the program code executable by the processing unit to auto capture of the one or more keywords further comprises program code executable by the processing unit to calculate a Euclidian distance between a context sensitive word vector representation and a content neutral word vector representations, and identify the one or more context sensitive keywords based on the Euclidian distance context.

8. The computer program product of claim 5, wherein the program code to apply the trained word vector model to context further comprises program code executable by the processing unit to apply a document to the context sensitive word vector representation and create a sentence vector representation of a document sentence, form one or more sentence clusters, and extract a cluster representative sentence for a formed cluster.

9. The computer program product of claim 8, wherein one or more cluster representative sentences for the document form a context sensitive document summary.

10. A method comprising:
generating one or more context vectors for context provided by a user or extracted from user behavior;
computing document relevance, including generating one or more document vectors for one or more documents, calculating respective distances between the one or more generated document vectors and the one or more context vectors, and assigning respective weights to the one or more documents based on the calculated distances;
generating one or more word vectors for the one or more documents, including representing the one or more documents as a collection set of word pairs from the one or more documents and respective frequencies associated with the word pairs in the one or more documents;
training a word vector generation model with at least a calculated weighted frequency, including training the word vector generation model to generate one or more context sensitive word vector representations, the calculated weighted frequency based upon the respective weights assigned to the one or more documents and the frequencies associated with the word pairs; and
applying a word vector model to context, including using the word vector generation model to generate the one or more context sensitive word vector representations.

11. The method of claim 10, further comprising calculating the weighted frequency on one or more word pairs and introducing context sensitivity into the word vectors.

12. The method of claim 10, wherein the returning of the summarized sentence document with auto capture of the one or more keywords further comprises calculating a Euclidian distance between a context sensitive word vector representation and a content neutral word vector representation, and identifying the one or more context sensitive keywords based on the Euclidian distance.

13. The method of claim 10, wherein applying the training word vector model to context further comprises applying a document to the context sensitive word vector representation and creating a sentence vector representation of a document sentence, forming one or more sentence clusters, and extracting a cluster representative sentence for a formed cluster.

14. The method of claim 13, wherein one or more cluster representative sentences for the document form a context sensitive document summary.

15. The computer system of claim 1, wherein the word manager configured to calculate the weighted frequency comprises the word manager configured to calculate weighted frequencies of a word pair on a document-by-document basis, and to merge the weighted frequencies of the word pair across the documents.

16. The computer system of claim 1, wherein the context provided by a user or extracted from user behavior comprise a problem definition or the user behavior.

17. The computer program product of claim 5, wherein the program code executable by the processor to calculate the weighted frequency comprises program code executable by the processor to calculate weighted frequencies of a word pair on a document-by-document basis, and to merge the weighted frequencies of the word pair across the documents.

18. The computer program product of claim 5, wherein the context provided by a user or extracted from user behavior comprise a problem definition or the user behavior.

19. The method of claim 10, wherein the calculating the weighted frequency comprises calculating weighted frequencies of a word pair on a document-by-document basis, and merging the weighted frequencies of the word pair across the documents.

20. The method of claim 10, wherein the context provided by a user or extracted from user behavior comprise a problem definition or the user behavior.

* * * * *